United States Patent [19]

Hau et al.

[11] 3,903,757

[45] Sept. 9, 1975

[54] HYDRAULIC DIFFERENTIAL GEAR BOX

[75] Inventors: Antonin Hau; Jiri Frydrych; Jiri Srubar, all of Prague, Czechoslovakia

[73] Assignee: Ustav pro vyzkum motorovych vozidel, Prague, Czechoslovakia

[22] Filed: Feb. 26, 1973

[21] Appl. No.: 335,732

[52] U.S. Cl. .................................. 74/688; 74/730
[51] Int. Cl. ...................... F16h 47/08; F16h 47/00
[58] Field of Search .......................... 74/688, 730

[56] References Cited
UNITED STATES PATENTS

| | | | |
|---|---|---|---|
| 2,890,601 | 6/1959 | Förster | 74/688 |
| 3,004,451 | 10/1961 | Hensel | 74/688 |
| 3,411,382 | 11/1968 | Mori | 74/688 |
| 3,426,618 | 2/1969 | Hau | 74/688 |
| 3,486,398 | 12/1969 | Waclawek | 74/730 X |

*Primary Examiner*—Samuel Scott
*Assistant Examiner*—P. S. Lall

[57] ABSTRACT

A hydraulic transmission comprising a casing, a hydraulic torque converter, a reduction gear system and a collecting gear system. The hydraulic torque converter is connected to the input shaft and to the reduction gear system. A first clutch selectively engages the input shaft to the collecting gear system and a second clutch selectively engages the reduction gear system and the collecting gear system. The collecting gear is an epicyclic system and has a crown wheel adapted to be engaged by a brake whereby selective reverse running is obtained.

6 Claims, 5 Drawing Figures

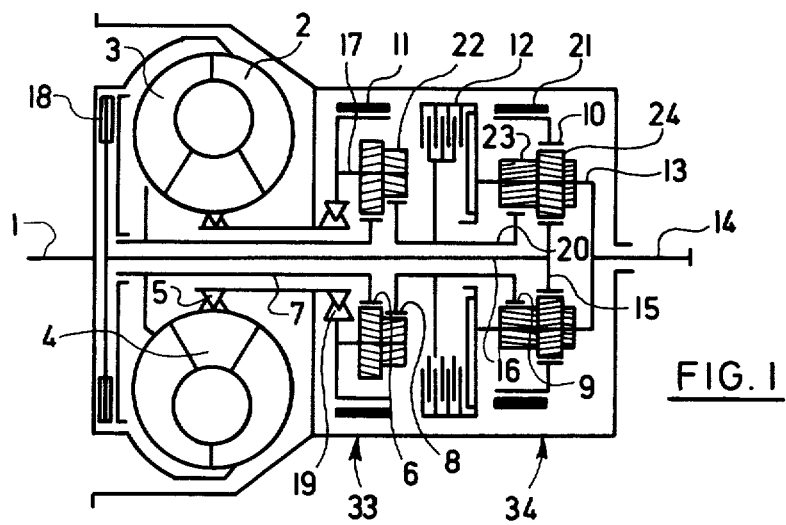
FIG. 1
| | | S 18 | S 12 | B 11 | B 21 | V 19 |
|---|---|---|---|---|---|---|
| N | | − | − | − | − | + |
| Z | | − | − | (+) | + | + |
| D | 1° | − | + | − | − | + |
| | 2° | + | − | − | − | + |
| | 3° | + | + | − | − | − |
| L | 1° | − | + | + | − | (+) |
| | 2° | + | − | + | − | (+) |
| I | 1° | − | + | + | − | (+) |
FIG. 2
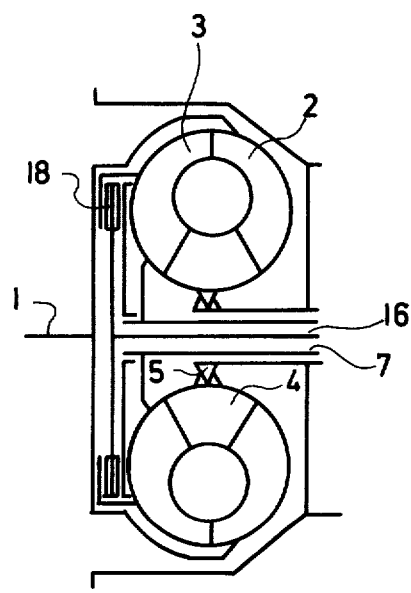
FIG. 3

HYDRAULIC DIFFERENTIAL GEAR BOX

BACKGROUND OF INVENTION

The present invention relates to automobile transmissions in particular to a hydraulic differential transmission for passenger cars and the like.

In well known differential transmissions, as for example those disclosed in Czechoslovak patent corresponding to application PV2070–66 and U.S. Pat. No. 3,426,618 a mechanical connection between the reduction gear system and the output shaft of the transmission is difficult to obtain, particularly when the transmission is to be used in an automobile having a rear engine or a front wheel drive.

It is the object of the present invention to provide an automobile transmission which avoids the difficulties of the prior art and constitutes an improvement thereover.

It is a further object of the present invention to provide an automobile transmission which may be easily and efficiently employed in vehicles having rear engines or front wheel drives.

It is still another object of the present invention to provide an automobile transmission which is simple in its construction.

Further objects and advantages of the present invention will be found in the following disclosure.

SUMMARY OF THE INVENTION

According to the present invention a hydraulic transmission is provided comprising an input shaft adapted to be connected to the vehicle engine, a hydraulic torque converter connected to the input shaft, a reduction gear system connected to the output of the hydraulic torque converter and a collecting gear system connected to the output shaft of the transmission; the collecting gear system being an epicyclic gear train. The transmission includes first clutch means for selectively connecting the input shaft with the collecting gear system and second collection means for selectively interengaging the reduction gear system and the collecting gear system. A brakeband fixed to the gear casings surrounds the crown wheel of the collecting gear system and is selectively engageable with the crown wheel to brake the same and to cause the collecting gear system to move in the reverse direction.

Advantagously the above system eliminates the need for directly connecting the reduction gear system to the output shaft of the transmission and enables the more flexible and versatile use of a collecting gear system interposed there between. As a result a smaller transmission is obtained and one which can be operated in several modes of speed shift.

Preferably the reduction system also comprises an epicyclic gear train having an input sun gear connected to the hydraulic torque converter and an output sun gear connected via the second clutch means to the corresponding sun gear of the collecting gear system as well as to the satelite carrier whereby selective speeds may be obtained from the collecting gear system. In one embodiment the epicyclic gear system of the reduction gear is made of two parallel different gear drives effecting still further variation.

Full details of the present invention are set forth in the following description of the preferred embodiments thereof and are shown in the accompanying drawings.

BRIEF DESCRIPTION OF THE DRAWINGS

In the drawings:

FIG. 1 is a diagramatic sectional view of the transmission embodying one form of the present invention.

FIG. 2 is a chart showing the selective engagement of the various elements of the transmission in several speed shift stages, FIG. 3 is a partial view of a transmission in accordance with the present invention show a modification thereof.

DESCRIPTION OF INVENTION

Figure 4:
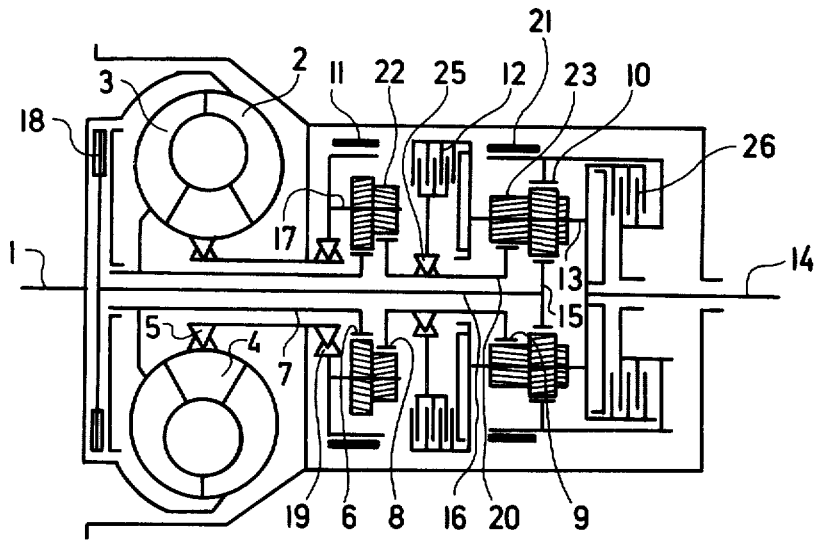
FIG. 4 is a view similar to that of FIG. 1 showing still a further embodiment of the present invention.

In FIG. 1 the transmission shown comprises a gear box casing into which an input shaft 1 passes. The input shaft is connected via conventional web to the pump 2 of a hydraulic torque converter having a turbine wheel 3 and a stator reactor 4. The reactor 4 is mounted via an overrunning clutch 5 about the core of the gear casing. The turbine wheel 3 is connected to the sun gear 6 of an epicyclic reduction gear system 33 via the main propeller shaft 7. The reduction gear system 33 includes a second or output sun gear 8 which is interconnected via means of a shaft 20 with the first sun gear 9 of an episiclical collecting gear system 34. The crown or ring gear 10 of the collecting system 34 is engagable by and is adapted to be braked by an selectively operable brakeband 21 fixedly mounted to the wall of the gear box casing.

The reduction gear system 33 includes a satelite gear carrier 17 which is mounted on the gear casing by an overunning clutch 19. The overrunning clutch permits the satelite gear carrier to rotate only in the positive direction with regard to the engine revolution itself, thus the satelite carrier 17 is adapted to be braked by a brakeband 11 which surrounds it and which itself is mounted fixedly on the interior surface of the gear box casing.

The collecting gear system includes a satelite gear carrier 13 connected to the output shaft 14 of the transmission. A clutch 12 selectively interconnects the shaft 20 and the output shaft 14 via the satelite carrier 13 and also controls the operation of the sun gear 9. A clutch 18 connects the input shaft 1 with a second sun gear 15 of the collecting gear system through a shaft 16. Returning to the reduction gear system it will be noted that it includes a double satelite gear 22 while the collecting gear system includes two independent simple engaging satelite gears 23 and 24.

The transmission shown in FIG. 1 has three forward speed shifts and one reverse speed shift obtained by the selective operation of the clutches and the brake means.

In the first speed shift the power output of the vehicle engine is transferred via the input shaft 1 to the pump wheel 2 of the torque converter. The turbine wheel 3 of the torque converter then operates the sun gear 6 of the reduction gear system 33 and after a multiplication of the torque moment by this gear system operation is transferred from the second sun gear 8 across the clutch 12, which is suitably engaged, to the satelite gear carrier 13 of the collecting gear system 34 whence it moves to the output shaft 14.

In the second speed shift the output of the vehicle engine is transferred in part from the input shaft 1 to the pump wheel 2 of the torque converter and in part across an engaged clutch 18 via the shaft 16 to the sun gear 15 of the collecting gear system 34. That portion of the engine power which is transferred via the pump wheel 2 of the torque converter across the turbine wheel 3 passes via the reduction gear 33 to the second sun gear 9 of the collecting gear system 34. As a result both sun gears 9 and 15 of the collecting gear system 34 are operative and their power outputs are passed across the satelite gear carrier 13 to the output shaft 14.

In the third speed shift, the total engine power output is transferred from the input shaft 1 through a closed clutch 18 to the shaft 16. The shaft 16 drives the sun gear 15 of the collecting gear system 34. Simultaneously clutch 12 is closed or engaged thus locking together the sun gears 9 and 15 whereby direct power is delivered to the satelite gears of the collecting system 34 hence to the carrier 13 and the output shaft 14 of the transmission.

In the reverse shift or running mode the total engine power output is transferred via the shaft 1 across the torque converter and the reduction gear 33 to the sun gear 9 of the collecting gear system. The clutch 12 is in this condition disengaged. The movement of the crown ring wheel 10 of the collecting gear system is locked by means of the brake 21 so that the satelite gear carrier 13 of the collecting gear system is caused to rotate in the negative or opposite revolutionary sense to that of the engine input. Consequently the output shaft 14 is rotated in the reverse direction. The operation of the transmission and its several elements is synoptically given in the table of FIG. 2.

In the table the transmission elements clutches 18, 12 brakes 11 and 21 and the overrunning clutch 19 are indicated horizontally across. The shift mode are indicated in the vertical, N meaning the neutral position of the transmission, Z the reverse running operation, D the automatic shift through the three forward speeds, (the third speed shift enabling the braking of the engine), L the automatic gear shift in the two lower speed gears (both speed shifts enabling engine braking) and l the compulsory shift into the first speed (this may also be used for engine braking). The symbol + defines an engaged or operating gear shifting element, the symbol − defines a disengagable or disengaged shift gear element, the symbol (+) defines an engaged element which engagement is nevertheless not necessary for the particular operation. For example, in the reverse mode both clutches 18 and 12 are open, the brakeband 11 may be engaged but is of no significance while the brakeband 21 is engaged and operative. The overrunning clutch 19 is operative as well. In the automatic gear shift similar operation can be followed with regard to the remaining speed modes. It will be observed from the above that in the normal drive modes indicated by the letter D three speed shifts can be made while in the lower drive mode wherein a greater torque is required two speed shifts are made. Still a third drive mode l providing a normal overdrive load can also be obtained.

The transmission shown in FIG. 1 can also be used as a four speed forward transmission. In this event the clutch 18 is arranged so that it can be shifted into engagement between the turbine wheel 3 of the hydraulic converter and the shaft 16 as shown diagramatically in FIG. 3. The overrunning clutch gear 19 is in this case not employed in the apparatus shown in FIG. 3 the speed shift transfers the power output of the engine from the input shaft 1 to the pump wheel 2 of the hydraulic converter and from the turbine wheel 3 across the clutch 18 through the shaft 16 to the sun gear 15 of the collecting gear 34. The crown wheel 10 of the collecting gear system 34 is arrested by the brake 21 so that the torque moment of the sun gear 15 is multiplied by the collecting gear system 34 and transferred via the satelite gear carrier 13 directly to the output shaft 14. The second, third and fourth speed shifts of the apparatus shown in FIG. 3 are identical with the first, second and third speed shifts of the three speed forward system shown and described with regard to FIG. 1. The reverse running in both cases are identical.

A further improvement of the transmission shown in FIG. 1 is shown in FIG. 4. In this embodiment a first additional overrunning clutch 25 is interposed between the shaft 20 and the clutch 12 and a second additional clutch 26 is interposed between the crown wheel 10 of the collecting gear system and the output shaft 14 of the transmission. The apparatus otherwise remains the same. The device as seen in FIG. 4 functions in that when a shift is made from the first speed mode into the second speed mode, it is sufficient only for the clutch 18 to be engaged and it is not necessary to disengage the clutch 12. The clutch 12 may remain engaged but does not function. The third speed is shifted by engaging the clutch 26. This arrangement obtains the maximum quality of gear shifting and simplification of the control system in the gear box itself.

Figure 5:
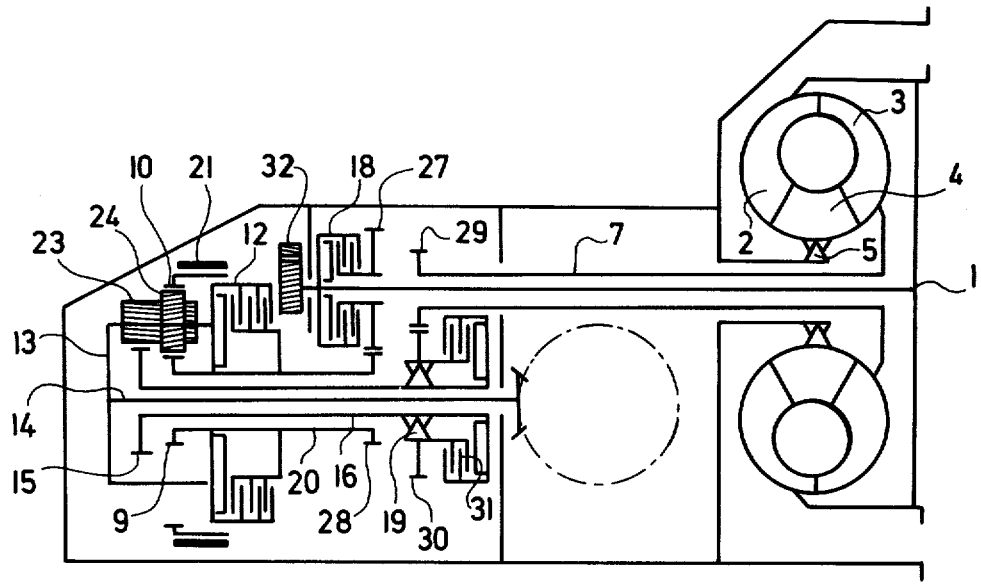
FIG. 5 is still another embodiment of the present invention in a view similar to that of FIG. 1.

FIG. 5 shows an arrangement of the present invention which is particularly adaptable for automobiles having rear engines or having a front engine with a front wheel drive. The function of the apparatus here is identical with the arrangement and specification according to FIG. 1 and the operation as shown in the table of FIG. 2. The various elements of the transmission are identical also and are marked as indicated in FIG. 1 except that the epicyclic reduction gear 33 is advantagously placed by two gear drive systems 27, 28, 29 and 30 which partly fulfils the epicyclic function of the reduction gear system. The two gear drives also in part simultaneously form the necessary automatic downshifting gear. The brake 11 of FIG. 1 is substituted by a clutch 31 which is situated between the overrunning clutch 30 and the shaft 16. The overrunning clutch 19 is itself situated parallel with the clutch 31 between the overrunning clutch 30 and the shaft 16. An oil pump 32 is situated at the end of the shaft 1 inside the gear box casing and supplies pressurized oil to the apparatus.

From the foregoing it will be apparent that an improved hydraulic transmission of more simplified form is provided and one which contains several modes and variations of operation. Various modifications and embodiments of the present invention have been shown in the foregoing disclosure, others will be apparent to those skilled in this art. It is intended therefore that the present disclosure be illustrative of the invention and not limiting of it in any way.

What is claimed is:

1. A hydraulic transmission comprising a casing, an input shaft, a hydraulic torque converter having an input connected to said input shaft, a reduction gear system connected to the output of said hydraulic torque converter, a collecting gear system comprising an epicyclic gear train having a crown wheel, a sun gear and a set of associated satellite gears, said satellite gears being mounted on a single carrier having an output shaft secured thereto, a first clutch means for selectively connecting said input shaft to the sun gear of said collecting gear system and second clutch means including a connecting shaft for selectively interengaging said reduction gear system with the sun gear of said collecting gear system, brake means fixed to said casing and selectively engagable with the crown gear wheel of said collecting gear system whereby said collecting gear system may be made to selectively drive said output shaft in the forward and reverse direction.

2. The transmission according to claim 1 wherein said reduction gear system comprises an epicyclic gear train having an input sun gear connected to the output of said torque converter and an output sun gear connect to said second clutch means, and including means for connecting the carrier of said collecting gear system to said second clutch, said second clutch being adapted to selectively connect said output sun gear with one of the sun gears and carrier of said collecting gear system.

3. The transmission according to claim 2 wherein said first clutch means disengages the input of the hydraulic torque converter from the input shaft on engagement of said input shaft with the crown wheel of said collecting gear system.

4. The transmission according to claim 1 wherein said collecting gear system has an output shaft and includes additional clutch means interposed between the output shaft and the carrier of said collecting gear system for selectively engaging the same.

5. The transmission according to claim 1 wherein the reduction gear system includes a pair of parallel differential gear drives, one of said gear drives being connected to the output of the hydraulic torque converter, the other of which is connected to the input shaft.

6. The transmission according to claim 1 including an overrunning clutch interposed between said second clutch means and the connecting shaft.

* * * * *